(12) United States Patent
Savari et al.

(10) Patent No.: US 9,416,306 B2
(45) Date of Patent: Aug. 16, 2016

(54) CLEAN FLUID LOSS CONTROL ADDITIVES

(71) Applicant: Halliburton Energy Services, Inc., Houston, TX (US)

(72) Inventors: Sharath Savari, Karnataka (IN); Dale E. Jamison, Houston, TX (US); Ramyakrishna Kothamasu, Andhrapradesh (IN); Anita Gantepla, Karnataka (IN); Cato McDaniel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 72 days.

(21) Appl. No.: 13/780,677

(22) Filed: Feb. 28, 2013

(65) Prior Publication Data

US 2014/0238674 A1    Aug. 28, 2014

(51) Int. Cl.
*C09K 8/514* (2006.01)
*C09K 8/035* (2006.01)
*E21B 21/00* (2006.01)

(52) U.S. Cl.
CPC .............. *C09K 8/514* (2013.01); *C09K 8/035* (2013.01); *E21B 21/003* (2013.01)

(58) Field of Classification Search
CPC ............................... E21B 43/261; E21B 43/28
USPC .................................................. 166/281, 294
See application file for complete search history.

(56) References Cited

U.S. PATENT DOCUMENTS

| | | | |
|---|---|---|---|
| 5,004,553 A | 4/1991 | House et al. | |
| 6,016,879 A | 1/2000 | Burts, Jr. | |
| 6,861,392 B2 | 3/2005 | Shaarpour | |
| 7,066,285 B2 | 6/2006 | Shaarpour | |
| 7,108,066 B2 | 9/2006 | Jamison | |
| 7,455,112 B2 | 11/2008 | Moorehead et al. | |
| 7,456,135 B2 | 11/2008 | Kirsner et al. | |
| 7,462,580 B2 | 12/2008 | Kirsner et al. | |
| 7,482,309 B2 | 1/2009 | Ravi et al. | |
| 7,488,704 B2 | 2/2009 | Kirsner et al. | |
| 7,534,743 B2 | 5/2009 | Kirsner et al. | |
| 7,534,744 B2 | 5/2009 | Shaarpour | |
| 7,547,663 B2 | 6/2009 | Kirsner et al. | |

(Continued)

FOREIGN PATENT DOCUMENTS

WO    2014133881 A1    9/2014

OTHER PUBLICATIONS

Halliburton Product Data Sheet STOPPIT™, Lost Circulation Material, 2012.

(Continued)

*Primary Examiner* — Angela M DiTrani
*Assistant Examiner* — Ashish Varma
(74) *Attorney, Agent, or Firm* — McDermott Will & Emery LLP; Craig Roddy

(57) ABSTRACT

Methods of providing fluid loss control in a portion of a subterranean formation comprising: providing a treatment fluid comprising a base fluid and a plurality of seeds; introducing the treatment fluid into a portion of a subterranean formation penetrated by a well bore such that the seeds block openings in the subterranean formation to provide fluid loss control; and degrading the seeds over time within the subterranean formation. In some methods, the seeds are present in the treatment fluid in an amount of at least about 5 pounds per barrel. In addition, in some methods the seeds are preferably degradable.

16 Claims, 1 Drawing Sheet

(56) References Cited

U.S. PATENT DOCUMENTS

| | | |
|---|---|---|
| 7,717,180 B2 | 5/2010 | Badalamenti et al. |
| 7,741,247 B2 | 6/2010 | Wang |
| 7,749,942 B2 | 7/2010 | Ravi et al. |
| 7,866,393 B2 | 1/2011 | Badalamenti et al. |
| 8,043,997 B2 | 10/2011 | Whitfill et al. |
| 8,132,623 B2 | 3/2012 | Allin et al. |
| 8,202,824 B2 | 6/2012 | Reddy et al. |
| 2002/0040812 A1 | 4/2002 | Heying |
| 2007/0187099 A1 | 8/2007 | Wang |
| 2009/0084554 A1* | 4/2009 | Williamson ............ C09K 8/02 166/308.4 |
| 2009/0176667 A1 | 7/2009 | Nguyen |
| 2009/0187484 A1* | 7/2009 | Arbogast ............... A01N 59/04 705/14.36 |
| 2009/0305911 A1* | 12/2009 | Pomerleau ............ C09K 8/035 507/104 |
| 2010/0056401 A1* | 3/2010 | Samuel .................... C09K 8/12 507/211 |
| 2010/0230169 A1* | 9/2010 | Pomerleau ..................... 175/72 |
| 2012/0136089 A1 | 5/2012 | Koltisko et al. |
| 2012/0165231 A1 | 6/2012 | Miller et al. |
| 2012/0196777 A1 | 8/2012 | Reddy et al. |
| 2012/0316088 A1 | 12/2012 | Kulkarni et al. |

OTHER PUBLICATIONS

Halliburton Article, Diamond Seal® Absorbent Polymer for Lost Circulation, 2008.

International Search Report and Written Opinion for PCT/US2014/017565 dated Jun. 24, 2014.

* cited by examiner

CLEAN FLUID LOSS CONTROL ADDITIVES

BACKGROUND

The present invention relates to improved lost circulation materials that can be used in reservoir and non-reservoir zones of a subterranean formation.

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit and providing a hydrostatic head to maintain the integrity of the wellbore walls, and prevent well blowouts. Specific drilling fluid systems, which can be oil-based or aqueous-based, are selected to optimize a drilling operation in accordance with the characteristics of a particular geological formation.

Oil-based muds are normally used to drill swelling or sloughing shales, salt, gypsum, anhydrite or other evaporite formations; hydrogen sulfide-containing formations; and high temperature (e.g., greater than about 300° F.) holes, but may be used in other holes penetrating a subterranean formation as well. Oil-based muds are commonly used as treatment fluids for drilling, stimulation, sand control, and completion operations. As used herein, the term "treatment," or "treating," refers to any subterranean operation that uses a fluid in conjunction with a desired function and/or for a desired purpose. The term "treatment," or "treating," does not imply any particular action by the fluid. On other cases, aqueous-based muds may be used, or emulsion muds having an aqueous component and an oil-based component.

Lost circulation is a common occurrence in drilling operations. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. Lost circulation may be a result of treatment fluid being lost to voids within the wellbore and/or the subterranean formation. As a result, the service provided by such fluid is more difficult to achieve. For example, a drilling fluid may be lost to the formation, resulting in the circulation of the fluid in the wellbore being too low to allow for further drilling of the wellbore. In addition, loss of fluids, such as oil-based muds may be quite expensive. Furthermore, the drilling operations may need to be interrupted until the circulation loss problem is solved, which may result in expensive idle rig time. Therefore, a treatment fluid for lost circulation control may be used. By way of nonlimiting example, voids may include pores, vugs, fissures, cracks, and fractures that may be natural or man-made. Several methods may be available for lost circulation control including bridging fractures, providing fluid loss control, sealing surfaces for fluid diversion, or plugging voids. In each method to control lost circulation, the rheological properties of the treatment fluid may be important to the efficacy of treatment. Lost circulation control fluids contain additives that at least partially plug voids, e.g., pores, cracks, or fractures, in a zone causing loss of circulation. These additives, when used in drilling fluids are typically called lost circulation materials. The more general term for controlling the loss of the treatment fluid from any subterranean fluid is "fluid loss control additives." That is, lost circulation materials are a subset of fluid loss control additives.

Many conventional fluid loss control additives permanently reduce the permeability of a subterranean formation, negatively affect the rheology of the treatment fluid in which they are used, and/or reduce the rate at which the fluid is allowed to penetrate or leak off into desirable locations within the subterranean formation. Moreover, while it may be desirable to control or prevent fluid loss for a given period of time, in some instances it may become desirable to later allow flow through that portion of the formation, such as in a reservoir zone once drilling is complete. Thus, costly and time-consuming operations may be required to reverse the effects of conventional fluid loss control additives on the treatment fluid and/or to restore permeability to those portions of the subterranean formation affected by the fluid loss control additives.

In addition, some known materials used as fluid control loss additives may give rise to other problems. In some instances, the fluid loss control additives used are toxic and thus may harm the environment; this problem may be aggravated because many are poorly degradable or nondegradable within the environment. Due to environmental regulations, costly procedures often must be followed to dispose of the treatment fluids containing such compounds, ensuring that they do not contact the marine environment and groundwater. Thus, it is desirable to use low environmental impact additives for treatment fluids. It would also be desirable to reduce the number of additives needed in a treatment fluid. In addition, some known materials require hydrocarbon treatments to remove them from the formation after they are placed or require a high temperature for removal, or a large volume of under-saturated liquid (such as for the removal of salts) to be removed.

Thus, while many lost circulation materials are known, there is still a need for materials that are non-hazardous, environmentally friendly, and provide the desired control, and are readily available.

SUMMARY OF THE INVENTION

The present invention relates to improved lost circulation materials that can be used in reservoir and non-reservoir zones of a subterranean formation.

Some embodiments of the present invention provide methods of providing fluid loss control in a portion of a subterranean formation comprising: providing a treatment fluid comprising a base fluid and a plurality of seeds; introducing the treatment fluid into a portion of a subterranean formation penetrated by a well bore such that the seeds block openings in the subterranean formation to provide fluid loss control; and degrading the seeds over time within the subterranean formation.

Other embodiments of the present invention provide methods of providing fluid loss control in a portion of a subterranean formation comprising: providing a treatment fluid comprising a base fluid and seeds, wherein the seeds are present in the treatment fluid in an amount of at least about 5 pounds per barrel; introducing the treatment fluid into a portion of a subterranean formation penetrated by a well bore such that the seeds block openings in the subterranean formation to provide fluid loss control; degrading the seeds over time within the subterranean formation.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
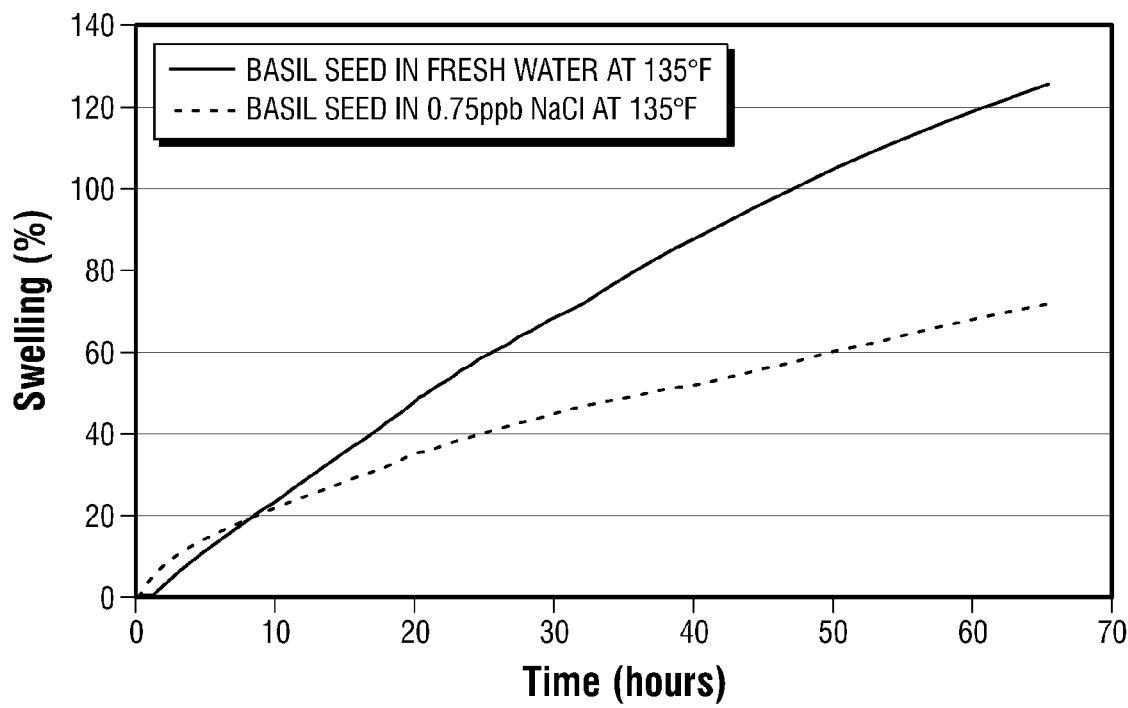
FIG. 1 shows the swelling of basil seeds in fresh water versus salt water.

The present invention relates to improved fluid loss control agents that can be used in reservoir and non-reservoir zones of a subterranean formation.

Providing effective fluid loss control for subterranean treatment fluids is highly desirable. "Fluid loss," as that term is used herein, refers to the undesirable migration or loss of fluids (such as the fluid portion of a drilling mud, fracturing fluid, or cement slurry) into a subterranean formation surrounding a wellbore and/or fracture. Treatment fluids may be used in any number of subterranean operations, including drilling operations, fracturing operations, acidizing operations, gravel-packing operations, acidizing operations, well bore clean-out operations, and the like. Fluid loss may be problematic in any number of these operations. In fracturing treatments, for example, fluid loss into the formation may result in a reduction in fluid efficiency, such that the fracturing fluid cannot propagate the fracture as desired. And in drilling operations, uncontrolled fluid loss (generally known as "lost circulation" in a drilling operation) may lead to not only loss of fluid, but potentially a loss of hydrostatic pressure. Fluid loss control additives (FLCA) are agents that lower the volume of a treatment fluid that undesirably escapes into a formation surrounding a wellbore or fracture. That is, they block the pore throats, vugs, channels, or other spaces that allow a treatment fluid to leak out of a desired zone and into an undesired zone. Particulate materials may be used as fluid loss control materials in subterranean treatment fluids to fill/bridge the pore spaces in a formation matrix and/or proppant pack and/or to contact the surface of a formation face and/or proppant pack, thereby forming a type of filter cake that blocks the pore spaces in the formation or proppant pack, and prevents fluid loss therein.

Fluid loss is often controlled using solid and/or swellable materials that penetrate and plug the opening surrounding a treatment area and thus stop treatment fluid from further flowing into the formation. The present invention provides improved methods of providing temporary fluid loss control of treatment fluids (such as drilling fluids, fracturing fluids, etc.) in subterranean producing zones penetrated by well bores. The methods include placing a treatment fluid comprising natural seeds such that they, alone or in combination with a traditional fluid loss control additive create a physical barrier to fluid flow (such as by blocking pore throats in a formation) and then allowing the seeds to degrade to remove the physical barrier. The seeds used are preferably "whole seeds" rather than only a portion or the shell of the seed. Where the term "whole seed" is used herein it should be used to understand that the seeds are being used in their entirety, rather than as only the exterior or shell of the seed. Where the term "seed" is used going forward it should be read to cover any portion of the seeds, but preferably the whole seed. While the seeds may degrade with only time and temperature, or may degrade over time in the presence of aqueous or non-aqueous fluids, in some embodiments a chemical agent may be added to speed or complete the degradation.

Of the many advantages of the present invention, the present invention provides methods for controlling fluid loss during subterranean treatment operations. By way of example, during a drilling operation the seeds may be used to control lost circulation—loss of fluid in the drilling annulus during drilling. In another example, fluid loss from a fracturing operation may be reduced using the methods of the present invention. According to the methods of the present invention, this result may be achieved through the addition of seeds as an FLCA. In some embodiments the seeds may be used in conjunction with a more traditional fluid loss control additive in order to provide more robust (that is, able to withstand higher pressure) fluid loss barrier. Where the seeds are known to be suitable for use in culinary applications, such as the use of basil seeds in drinks and desserts, it follows that the present invention may also provide for an FLCA that may reduce environmental impact.

In one embodiment of the present invention is a method comprising providing a treatment fluid comprising a base fluid and seeds and then placing the treatment fluid into a proportion of a subterranean formation.

The seeds suitable for use in the present invention include, but are not limited to, solid seeds that swell upon hydration, such as basil seeds, cotton seeds, corn seeds, watermelon seeds, sunflower seeds, pumpkin seeds, kapok seeds, flax seeds, cattoil seeds, cherry pits, palm kernels and combinations thereof. In some cases, such as with basil seeds, the seeds may swell over time in the presence of water, which may increase their efficacy as a fluid loss control additive.

Where the selected seeds are swellable, the total time required for the swellable seeds to swell may range from about 2 hours to about 4 weeks. By way of example, when basil seeds were placed into ample fresh water at room temperature, and they swelled to about 13-times their original volume in 2 hours. In some cases, the swellable seeds may swell more quickly in the presence of fresh water than in the presence of a brine treatment fluid.

Where swellable seeds are selected, different seeds may swell at different rates under different conditions, and so it may be desirable to swell the seeds partially or fully before they are placed into a treatment fluid and sent down hole. Prior swelling may be timed such that the seeds swell partially before placed downhole and then complete the swelling during and/or after placement. In other cases, the swellable seeds may be placed into the treatment fluid dry and they will swell as they travel down hole.

In some embodiments, the seeds of the present invention may comprise a "compliant" fluid loss control additive. As used herein, the term "compliant" refers to materials described in 21 CFR §§170-199 (substances approved as food items, approved for contact for food, or approved for use as an additive to food) and that are prepared from food-grade materials. In some embodiments, the compliant seeds of the present invention may potentially eliminate the need for disposal of the treatment fluids containing non-compliant additives and may help reduce negative impacts on the marine environment and groundwater. Additionally, compliant seeds according to the present invention may provide effective treatment of the formation without excessive damage caused by the use of non-compliant additives. The selection of the desired seed may be at least partially based on the size for the swellable seed relative to the size of the rock or formation pores. Suitable sizes can range from a micron to as large as 8 U.S. Mesh. In some preferred embodiments, the swellable seeds are sized from about 1 to about 500 microns before any swelling.

While some of the seed materials may degrade completely over time with only the presence of water, it may be desirable to speed the degradation by exposing the seeds to an acid when restoration of permeability is desired. By way of example, when unswollen basil seeds were placed into a 15% HCl solution at 200° F., approximately 62% had been found to dissolve after 2 hours. One of skill in the art will recognize that a weaker acid solution may also be useful over a longer period of time. It is desirable for the seeds to be able to maintain fluid loss control for at least the duration of the treatment. In the case of drilling operations, the time should take as long as is necessary to drill and complete the zone; which could span up to three weeks.

Suitable acids include organic acids such as acetic, citric, lactic, oxalic, uric, and formic acid as well as mineral acids such a hydrochloric, sulfuric, nitric, phosphoric, hydrofluoric, hydrobromic, perchloric, and boric acids. Also, in some cases it may be desirable to place the seeds with a material that is not acidic but that will itself degrade to produce an acid over time. Such materials include, methyl lactate; ethyl lactate; propyl lactate; butyl lactate; formate esters; ethylene glycol monoformate; ethylene glycol diformate; diethylene glycol diformate; glyceryl monoformate; glyceryl diformate; glyceryl triformate; triethylene glycol diformate; ethylene glycol monoformate; diethylene glycol diformate; glycerol esters; glycerol polyesters; tripropionin; trilactin; acetic acid esters, glycerol esters; monoacetin; diacetin; triacetin; aliphatic polyesters; poly(lactides); poly(glycolides); poly(s-caprolactones); poly(hydroxybutyrates); poly(anhydrides); aliphatic polycarbonates; poly(amino acids); polyphosphazenes; derivatives and combinations thereof. Additional details on acid-generating compounds may be found in U.S. Pat. No. 7,455,112, the entire disclosure of which is hereby incorporated by reference. As used herein the term "derivative" when used to modify a given chemical refers to "a compound that can be imagined to arise from a parent compound by replacement of one atom with another atom or group of atoms."

In some embodiments, the treatment fluid may contain a traditional fluid loss control additive. A traditional fluid loss control additive for use in the present invention may be any known lost circulation material, bridging agent, fluid loss control agent, diverting agent, or plugging agent suitable for use in a subterranean formation. The lost circulation material may be natural or synthetic, degradable or nondegradable, particles or fibers, and mixtures thereof. It should be understood that the term "particulate" or "particle," as used in this disclosure, includes all known shapes of materials, including substantially spherical materials, fibrous materials, high-to-low aspect ratio materials, polygonal materials (such as cubic materials), and mixtures thereof. Suitable fluid loss control additives include, but are not limited to, sand, shale, bauxite, ceramic materials, glass materials, metal pellets, high strength synthetic fibers, cellulose flakes, wood, resins, polymer materials (crosslinked or otherwise), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof.

In some embodiments, a traditional fluid loss control additive may be degradable. Nonlimiting examples of suitable degradable materials that may be used in conjunction with the present invention include, but are not limited to, degradable polymers (crosslinked or otherwise), dehydrated compounds, and/or mixtures of the two. In choosing the appropriate degradable material, one should consider the degradation products that will result. As for degradable polymers, a polymer is considered to be "degradable" herein if the degradation is due to, inter alia, chemical and/or radical process such as hydrolysis, oxidation, enzymatic degradation, or UV radiation. Specific examples of suitable polymers include polysaccharides; chitin; chitosan; proteins; orthoesters; aliphatic polyesters; poly(lactide); poly(glycolide); poly(E-caprolactone); poly(hydroxybutyrate); poly(anhydrides); aliphatic polycarbonates; poly(orthoesters); poly(amino acids); poly (ethylene oxide); polyphosphazenes; and combinations thereof Dehydrated compounds may be used in accordance with the present invention as a degradable solid particulate. A dehydrated compound is suitable for use in the present invention if it will degrade over time as it is rehydrated. For example, a particulate solid anhydrous borate material that degrades over time may be suitable. Specific examples of particulate solid anhydrous borate materials that may be used include, but are not limited to, anhydrous sodium tetraborate (also known as anhydrous borax) and anhydrous boric acid. Certain degradable materials may also be suitable as compositions of a solid degradable particulate for use in the present invention. One example of a suitable blend of materials is a mixture of poly(lactic acid) and sodium borate where the mixing of an acid and base could result in a neutral solution where this is desirable. Another example would include a blend of poly(lactic acid) and boric oxide, a blend of calcium carbonate and poly(lactic) acid, a blend of magnesium oxide and poly(lactic) acid, and the like. In certain preferred embodiments, the degradable material is calcium carbonate plus poly(lactic) acid. Where a mixture including poly(lactic) acid is used, in certain preferred embodiments the poly(lactic) acid is present in the mixture in a stoichiometric amount, e.g., where a mixture of calcium carbonate and poly(lactic) acid is used, the mixture comprises two poly(lactic) acid units for each calcium carbonate unit. Other blends that undergo an irreversible degradation may also be suitable, if the products of the degradation do not undesirably interfere with either the conductivity of the filter cake or with the production of any of the fluids from the subterranean formation.

In some embodiments, a fluid loss control agent (whether that is seeds alone or seeds in combination with a traditional fluid loss control additive) may be present in a treatment fluid in an amount from a lower limit of greater than about 0.01 pounds per barrel (PPB), 0.05 PPB, 0.1 PPB, 0.5 PPB, 1 PPB, 3 PPB, 5 PPB, or 10 PPB to an upper limit of less than about 150 PPB, 100 PPB, 50 PPB, 25 PPB, 10 PPB, 5 PPB, 4 PPB, 3 PPB, 2 PPB, 1 PPB, or 0.5 PPB in the treatment fluid, where the amount may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit. It should be noted that when "about" is provided at the beginning of a numerical list, "about" modifies each number of the numerical list.

The teachings of the present invention and the methods of the present invention may be used in many different types of subterranean treatment operations. Such operations include, but are not limited to, drilling operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, and sag control operations. The methods and compositions of the present invention may be used in full-scale operations or pills. As used herein, a "pill" is a type of relatively small volume of specially prepared treatment fluid placed or circulated in the wellbore.

When the treatment fluid is a drilling operation, the treatment fluid will generally contain viscosifying clays and weighting agents. For example, the fluid may contain barite and bentonite in one embodiment.

When the treatment fluid is an aqueous acid solution, the aqueous acid solution can include one or more acids such as hydrochloric acid, hydrofluoric acid, acetic acid, formic acid and other organic acids. For example, in acidizing procedures for increasing the porosity of subterranean producing zones, a mixture of hydrochloric and hydrofluoric acids is commonly used in sandstone formations.

When the treatment fluid is a scale inhibitor treatment it may contain one or more scale inhibitor materials including, but not limited to, phosphonic acid based scale inhibitors such as diethylene triamine penta(methylene phosphonic acid) and bis(hexamethylene) triamine penta(methylene phosphonic acid), and polymeric scale inhibitors such as phosphinocarboxylic acid copolymers, polyaspartic acid, and polyacrylate. These scale inhibitor materials attach themselves to the subterranean zone surfaces whereby they inhibit the formation of scale in tubular goods and the like when hydrocarbons and water are produced from the subterranean zone.

When the treatment fluid is a water blocking treatment it may contain one or more water blocking materials that attach themselves to the formation in water producing areas whereby the production of water is reduced or terminated. Examples of water blocking materials that can be used include, but are not limited to, sodium silicate gels, organic polymers with metal cross-linkers and organic polymers with organic cross-linkers. Of these, cross-linked organic polymers may be preferred.

When the treatment fluid is a clay stabilizer treatment it may contain one or more clay stabilizer materials used to prevent the migration or swelling of clays within the formation. Examples of clay stabilizer materials that can be used include, but are not limited to, ammonium salts, polyamines, and polyquaternary amines (such as polydimethyldiallyl ammonium chloride).

When the treatment fluid is a biocide operation it may contain one or more biocide materials used to reduce or eliminate biological contamination within the subterranean formation. Suitable examples of biocides may include both oxidizing biocides and nonoxidizing biocides. Examples of oxidizing biocides include, but are not limited to, sodium hypochlorite, hypochlorous acid, chlorine, bromine, chlorine dioxide, and hydrogen peroxide. Examples of nonoxidizing biocides include, but are not limited to, aldehydes, quaternary amines, isothiazolines, carbamates, phosphonium quaternary compounds, and halogenated compounds. Factors that determine what biocide will be used in a particular application may include, but are not limited to, cost, performance, compatibility with other components of the treatment fluid, kill time, and environmental compatibility. One skilled in the art with the benefit of this disclosure will be able to choose a suitable biocide for a particular application.

When the treatment fluid is a fracturing operation, a frac-packing operation, or gravel packing operation, or some other operation used to either place particulates or stimulate the formation, the treatment fluid will generally be made more viscous through the use of viscosifiers and perhaps crosslinkers.

The seeds of the present invention may be incorporated into any appropriate base fluid that has an aqueous component for introduction into the subterranean formation based on the treatment being performed. Suitable base fluids for use in conjunction with the present invention may include, but not be limited to, aqueous-based fluids, water-in-oil emulsions, or oil-in-water emulsions. Suitable aqueous-based fluids may include fresh water, saltwater (e.g., water containing one or more salts dissolved therein), brine (e.g., saturated salt water), seawater, and any combination thereof. Suitable emulsions (be they invert water-in-oil or traditional oil-in-water), may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset there between. It should be noted that for water-in-oil and oil-in-water emulsions, the "water" component may be any of the aqueous fluids listed above (fresh water, saltwater, brine, seawater, and any combination thereof). In some embodiments, the aqueous fluid may be present in a treatment fluid of the present invention in an amount in the range of about 50% to about 99.9% of the treatment fluid. In some embodiments, fresh water may be the preferred aqueous base fluid.

Where desired, the treatment fluid may be viscosified to enhance the suspension of solids in the fluid and to additionally prevent fluid loss. Suitable viscosifying agents may comprise any substance (e.g. a polymeric material) capable of increasing the viscosity of the treatment fluids. In certain embodiments, the viscosifying agent may comprise one or more polymers that have at least two molecules that are capable of forming a crosslink in a crosslinking reaction in the presence of a crosslinking agent, and/or polymers that have at least two molecules that are crosslinked (i.e., a crosslinked viscosifying agent). The viscosifying agents may be biopolymers, polysaccharides, and/or derivatives thereof that contain one or more of these monosaccharide units: galactose, mannose, glucose, xylose, arabinose, fructose, glucuronic acid, or pyranosyl sulfate. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. Examples of suitable viscosifying agents include, but are not limited to, cellulose derivatives, carboxymethylguars, carboxymethylhydroxyethylguars, carboxymethylhydroxypropylguars, hydroxyethylcelluloses, carboxyethylcelluloses, carboxymethylcelluloses, carboxymethylhydroxyethylcelluloses, diutan gums, xanthan gums, galactomannans, hydroxyethylguars, hydroxypropylguars, scleroglucans, wellans, starches (also known as polysaccharide gums), and any derivative and combination thereof. In some embodiments a compliant viscosifying agent may be used, examples of suitable compliant viscosifying agents include carboxyethylcellulose, carboxymethylcellulose (CMC), carboxymethylhydroxyethylcellulose, and any combination thereof.

In some embodiments, an additive may optionally be included in a base treatment fluid used in the present invention. Examples of such additives may include, but are not limited to: salts; weighting agents; inert solids; fluid loss control agents; emulsifiers; dispersion aids; corrosion inhibitors; emulsion thinners; emulsion thickeners; viscosifying agents; high-pressure, high-temperature emulsifier-filtration control agents; surfactants; particulates; proppants; lost circulation materials; pH control additives; foaming agents;

breakers; biocides; crosslinkers; stabilizers; chelating agents; scale inhibitors; gases; mutual solvents; oxidizers; reducers; and any combination thereof. A person of ordinary skill in the art, with the benefit of this disclosure, will recognize when an additive should be included in a base treatment fluid, as well as an appropriate amount of said additive to include.

To facilitate a better understanding of the present invention, the following examples of preferred embodiments are given. In no way should the following examples be read to limit, or to define, the scope of the invention.

EXAMPLES

The swelling of basil seeds in fresh water versus salt water is shown in FIG. 1. For this example, the fresh water results are for 2 grams of basil seeds that were added to 200 milliliters of fresh water. The salt water results are for 2 grams of basil seeds that were added to 200 milliliters of fresh water and 0.43 grams of sodium chloride. The swelling for fresh and salt water was measured over time at 135° F. and, as seen in FIG. 1, basil seeds in salt water initially swelled faster than the fresh water seeds, but after about 10 hours of swelling, the seeds in fresh water showed more swelling.

Figure 2:
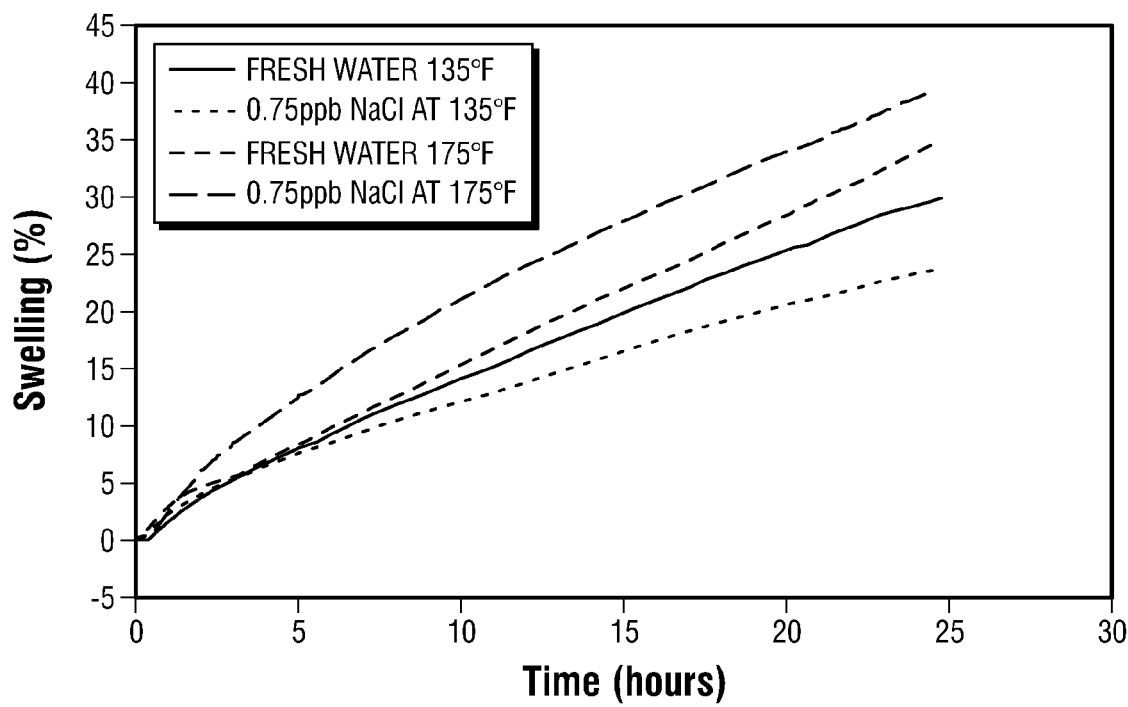
FIG. 2 shows the swelling of basil seeds in fresh water versus salt water at 135° F. versus 175° F.

The swelling of basil seeds in fresh water versus salt water at differing temperatures is shown in FIG. 2. Again for this example, the fresh water results are for 2 grams of basil seeds that were added to 200 milliliters of fresh water. The salt water results are for 2 grams of basil seeds that were added to 200 milliliters of fresh water and 0.43 grams of sodium chloride. One each of the salt water mixture and the fresh water mixture was allowed to swell at 135° F. while another was allowed to swell at 175° F. The results show that basil seeds in salt water at 135° F. swell less over time than the fresh water counterpart. While the results at 175° F. appear to show that swelling is greater in salt water and in fresh water, this is believed to be inaccurate data. It is believed that the fresh water swelling should be greater than the salt water swelling at all temperature levels.

Embodiments disclosed herein include:

A. Methods of providing fluid loss control in a portion of a subterranean formation using a treatment fluid comprising a base fluid and a plurality of seeds. The methods involve introducing the treatment fluid into a portion of a subterranean formation penetrated by a well bore such that the seeds block openings in the subterranean formation to provide fluid loss control; and, degrading the seeds over time within the subterranean formation.

B. Methods of providing fluid loss control in a portion of a subterranean formation using a treatment fluid comprising a base fluid and seeds, wherein the seeds are present in the treatment fluid in an amount of at least about 5 pounds per barrel. The treatment fluid is then introduced into a portion of a subterranean formation penetrated by a well bore such that the seeds block openings in the subterranean formation to provide fluid loss control. Then, after placement, degrading the seeds over time within the subterranean formation.

Each of embodiments A and B may have one or more of the following additional elements in any combination:

Element 1: wherein the seeds are swellable seeds that swell in contact with water.

Element 2: wherein the seeds are a compliant material.

Element 3: wherein the treatment fluid further comprises a traditional fluid loss control additive.

Element 4: wherein the traditional fluid loss control additive is a degradable particulate.

Element 5: wherein the seeds are present in the treatment fluid in an amount from about 0.1 pounds per barrel to about 150 pounds per barrel.

Element 6: wherein the treatment fluid is a viscosified fluid.

Element 7: wherein the treatment fluid is used to provide fluid loss control wherein the treatment fluid is placed into a portion of the subterranean formation at a pressure sufficient to create or extend at least one fracture therein and the seeds plug openings in the fracture faces and/or the surrounding formation to provide fluid loss control in the portion of the subterranean formation.

Element 8: wherein the treatment fluid is used as a drilling fluid and the seeds reduce loss circulation.

Element 9: wherein the seeds are selected from the group consisting of basil seeds, cotton seeds, corn seeds, watermelon seeds, sunflower seeds, pumpkin seeds, kapok seeds, flax seeds, cattoil seeds, cherry pits, palm kernels, and combinations thereof.

By way of non-limiting example, exemplary combinations applicable to A and B include:

Combination 1: The method of A or B in combination with Elements 1 and 2.

Combination 2: The method of A or B in combination with Elements 1 and 3.

Combination 3: The method of A or B in combination with Elements 1 and 8.

Combination 4: The method of A or B in combination with Elements 1, 2 and 8.

Combination 5: The method of A or B in combination with Elements 1, 3 and 8.

Therefore, the present invention is well-adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patents or other documents that may be incorporated herein by reference, the definitions that are consistent with this specification should be adopted.

What is claimed is:

1. A method of providing fluid loss control in a portion of a subterranean formation comprising:

providing a treatment fluid comprising a base fluid and a plurality of whole seeds, the seeds consisting of whole basil seeds;

introducing the treatment fluid into a portion of a subterranean formation penetrated by a well bore such that the seeds swell and block openings in the subterranean formation to provide fluid loss control; and, degrading the whole basil seeds over time within the subterranean formation.

2. The method of claim 1 wherein the seeds are a compliant material.

3. The method of claim 1 wherein the treatment fluid further comprises a traditional fluid loss control additive.

4. The method of claim 3 wherein the traditional fluid loss control additive is a degradable particulate.

5. The method of claim 1 wherein the seeds are present in the treatment fluid in an amount from about 0.1 pounds per barrel to about 150 pounds per barrel.

6. The method of claim 1 wherein the treatment fluid is a viscosified fluid.

7. The method of claim 1 wherein the treatment fluid is used to provide fluid loss control wherein the treatment fluid is placed into a portion of the subterranean formation at a pressure sufficient to create or extend at least one fracture therein and the seeds plug openings in the fracture faces and/or the surrounding formation to provide fluid loss control in the portion of the subterranean formation.

8. The method of claim 1 wherein the treatment fluid is used as a drilling fluid and the seeds reduce loss circulation.

9. A method of providing fluid loss control in a portion of a subterranean formation comprising:

providing a treatment fluid comprising a base fluid and whole seeds, wherein the seeds are present in the treatment fluid in an amount of at least about 5 pounds per barrel, and the seeds consisting of whole basil seeds;

introducing the treatment fluid into a portion of a subterranean formation penetrated by a well bore such that the seeds swell and block openings in the subterranean formation to provide fluid loss control;

degrading the seeds over time within the subterranean formation.

10. The method of claim 9 wherein the seeds are a compliant material.

11. The method of claim 9 wherein the treatment fluid further comprises a traditional fluid loss control additive.

12. The method of claim 11 wherein the traditional fluid loss control additive is a degradable particulate.

13. The method of claim 9 wherein the seeds are present in the treatment fluid in an amount from about 0.01 ppb to about 150 ppb.

14. The method of claim 9 wherein the treatment fluid is a viscosified fluid.

15. The method of claim 9 wherein the treatment fluid is used to provide fluid loss control wherein the treatment fluid is placed into a portion of the subterranean formation at a pressure sufficient to create or extend at least one fracture therein and the seeds plug openings in the fracture faces and/or the surrounding formation to provide fluid loss control in the portion of the subterranean formation.

16. The method of claim 9 wherein the treatment fluid is used as a drilling fluid and the seeds reduce loss circulation.

* * * * *